P. SOULE.
DRUM FOR DONKEY ENGINES.
APPLICATION FILED AUG. 21, 1909.

969,146.

Patented Aug. 30, 1910.

Witnesses:
John Sperb
Margaret Danford

Inventor:
Page Soule
by T. J. Geisler
Atty.

UNITED STATES PATENT OFFICE.

PAGE SOULE, OF LEBAM, WASHINGTON.

DRUM FOR DONKEY-ENGINES.

969,146.  Specification of Letters Patent.  Patented Aug. 30, 1910.

Application filed August 21, 1909. Serial No. 514,058.

*To all whom it may concern:*

Be it known that I, PAGE SOULE, a resident of Lebam, Pacific county, State of Washington, have invented a new and useful Improvement in Drums for Donkey-Engines, of which the following is a specification, reference being had to the accompanying drawings as constituting a part thereof.

This invention relates to means for winding the line or cable properly on the drum. Heretofore the line was fastened at one side of the drum and a "fair-leader" was positioned at the center of the drum, and the result was that the line was wound loosely, leaving spaces between the strands until the line had approximately been wound to the center of the drum. The over-lying course of line would in consequence not have a firm support, but be drawn in between the spaces of the underlying course of the line, and this condition cut up and ruined portions of the line. To avoid this, the engineer was obliged, after each time that the line had been let out its full length, in starting to rewind the line on the drum, to drive the laps close together, up to the center of the drum which was time-consuming work; but even the driving of the laps close together does not stop altogether the cutting of the line, if the latter be not wound tight on the drum. In my drum, I have overcome this difficulty by fastening the line at the center of the drum against a spiral peripheral guide flange of the depth of the line to be used and leading toward one flange of the drum, thereby causing the line to be wound closely from the center to such flange; and the line so wound forms a grooved surface for the next course of the line to wind on, and thus avoids all difficulty; for when, using a drum constructed in accordance with my improvement, the fair-leader will effectively operate to pull the line close to the peripheral guide flange on the drum, when first starting to wind the line thereon, and the succeeding laps of the line will in turn be drawn tight against the first lap.

Figure 1:
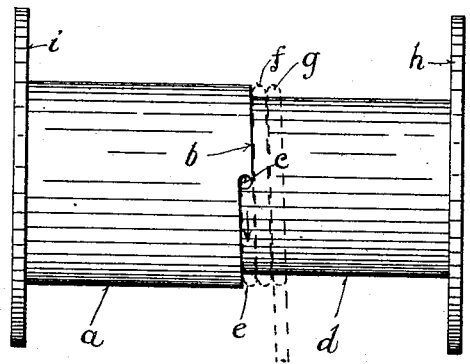
Figure 2:
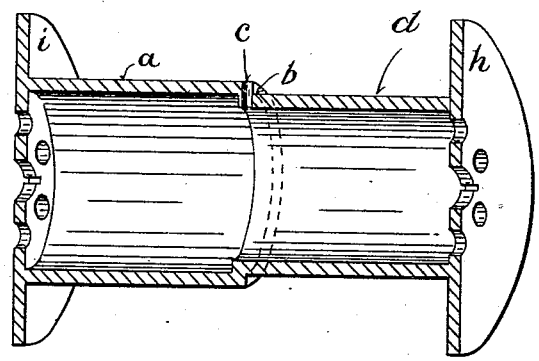
Figure 3:
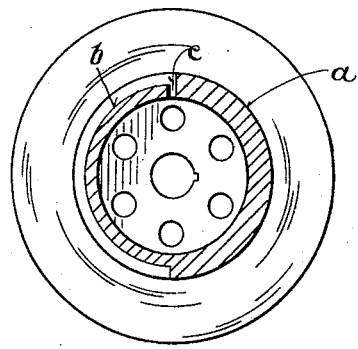

In the drawings, Figure 1 is a side elevation of my drum; Fig. 2 is a perspective, longitudinal section; Fig. 3 is a transverse section, intersecting the spiral guide flange of the drum.

The drum is made in all its details of construction substantially as heretofore, excepting on the following particulars; The cylindrical wall $a$, is provided at the center with a peripheral spiral guide flange $b$, beginning near a hole $c$, through which the cable end is inserted and then fastened, against being pulled out, by the usual clamps or by any other convenient means. The drum at $d$, is of smaller diameter than the other half of the drum. The fair-leader (not shown) would be positioned approximately in alinement with the center of the drum, as usual, and the drum upon being rotated would wind the first lap of the line against the guide flange $b$, in the direction of the arrow shown in Fig. 1. The line as apparent would be drawn tight against such guide-flange $b$, in completing the first lap $e$, and the subsequent lapses $f$—$g$, etc., would, in turn, be drawn tight against the preceding lap, until the successive laps of the cable had reached the flange $h$. When the line is wound on its second course, from the drum flange $h$, to the flange $i$, it will follow and be guided to its proper place by, the grooves intermediate the laps of the first course of the line. The only difficulty was with the first course of the line around the drum, for if this part of the winding is improperly done, the winding of the superposed courses would also be improper, and have a tendency to cut up, and shorten the life of the line.

I claim:

1. A drum for donkey engine provided with a peripheral spiral guide-flange leading to one end-flange of the drum, and adapted to the thickness of the line, the periphery of the drum between said guide-flange and said end-flange being of reduced diameter.

2. A drum for donkey engine provided with a hole to receive one end of the line and a peripheral spiral guide-flange leading to one end-flange of the drum and adapted to the thickness of the line, the periphery of the drum, between said guide-flange and said end-flange being of reduced diameter.

3. A drum for donkey engine provided with a hole to receive one end of the line and a peripheral spiral guide-flange leading to one end-flange of the drum, the periphery of the drum between said guide-flange and said end-flange being of reduced diameter.

PAGE SOULE.

Witnesses:
Z. J. GEISLER,
JOHN APERL.